(12) United States Patent
Robohm et al.

(10) Patent No.: US 7,039,041 B2
(45) Date of Patent: May 2, 2006

(54) OPERATIONAL SUPPORT SYSTEM FOR TELECOMMUNICATION SERVICES

(76) Inventors: Kurt W. Robohm, 207 Paddock Ct. NW., Leesburg, VA (US) 20176-2060; Robert J. Frye, 10902 Quimby Point La., Reston, VA (US) 20191

( * ) Notice: Subject to any disclaimer, the term of this patent is extended or adjusted under 35 U.S.C. 154(b) by 994 days.

(21) Appl. No.: 10/097,864

(22) Filed: Mar. 15, 2002

(65) Prior Publication Data
US 2002/0136369 A1    Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
H04L 12/66    (2006.01)

(52) U.S. Cl. .............. 370/352; 370/401; 370/216; 379/88.17

(58) Field of Classification Search .............. None
See application file for complete search history.

(56) References Cited

U.S. PATENT DOCUMENTS

| | | | |
|---|---|---|---|
| 5,608,720 A | 3/1997 | Biegel et al. | |
| 5,758,343 A | 5/1998 | Vigil et al. | |
| 5,877,759 A | 3/1999 | Bauer | |
| 5,999,612 A | 12/1999 | Dunn et al. | |
| 6,008,805 A | 12/1999 | Land et al. | |
| 6,115,741 A | 9/2000 | Domenikos et al. | |
| 6,125,391 A | 9/2000 | Meltzer et al. | |
| 6,145,001 A | 11/2000 | Scholl et al. | |
| 6,154,743 A | 11/2000 | Leung et al. | |
| 6,175,565 B1 | 1/2001 | McKinnon | |
| 6,189,033 B1 | 2/2001 | Jin et al. | |
| 6,192,405 B1 | 2/2001 | Bunnell | |
| 6,192,418 B1 | 2/2001 | Hale et al. | |
| 6,195,697 B1 | 2/2001 | Bowman-Amuah | |
| 6,208,986 B1 | 3/2001 | Schneck et al. | |
| 6,282,281 B1 | 8/2001 | Low | |
| 6,292,482 B1 * | 9/2001 | Pickett | 370/352 |
| 6,330,560 B1 | 12/2001 | Harrison et al. | |
| 6,418,324 B1 | 7/2002 | Doviak et al. | |
| 6,625,169 B1 * | 9/2003 | Tofano | 370/466 |
| 2001/0032076 A1 | 10/2001 | Kursh | |
| 2001/0037379 A1 | 11/2001 | Livnat | |
| 2001/0037469 A1 | 11/2001 | Gupta et al. | |
| 2001/0049745 A1 | 12/2001 | Schoeffler | |
| 2002/0023232 A1 | 2/2002 | Serani et al. | |

FOREIGN PATENT DOCUMENTS

| | | |
|---|---|---|
| WO | 97/22209 | 6/1997 |
| WO | 98/53582 | 5/1998 |

OTHER PUBLICATIONS

"Netscape ECXpert Data Sheet", Netscape.com, copyright 2000, pp. 1-5.

(Continued)

*Primary Examiner*—Duc Ho (57) ABSTRACT

An operational support system includes a group of legacy telephony system components, a group of data network components, and a process manager. The process manager manages communications between the legacy telephony system components and the data network components.

27 Claims, 9 Drawing Sheets

OTHER PUBLICATIONS

Putman, Janis, "Distribution Transparencies for Integrated System", MITRE Corp., Feb. 2000, pp. 1-18.

W. Yeong et al., "Lightweight Directory Access Protocol", RFC 1777, Mar. 1995, pp. 1-16.

"Businessware Overview", www.vitria.com, pp. 1-2, print date Mar. 14, 2002.

"Netegrity SiteMinder 4.6", www.netegrity.com, p. 1, print date Mar. 14, 2002.

"The iPlanet Web Server Keeps Data Safe", www.iplanet.com, p. 1, print date Mar. 14, 2002.

"Call *Center@nywhere*: The Complete Contact Center Solution", www.telephonyatwork.com, pp. 1-4, print date Mar. 14, 2002.

"Infranet", www.portal.com/products/infranet/infranet.html, pp. 1-4, print date Mar. 14, 2002.

www.xacct.com, 8 pages regarding XACCT usage, print date Mar. 14, 2002.

Actuate Software, www.actuate.com/products/software/software.asp, print date Apr. 17, 2002.

\* cited by examiner

OPERATIONAL SUPPORT SYSTEM FOR TELECOMMUNICATION SERVICES

RELATED APPLICATION

This application claims priority under 35 U.S.C. § 119(e) based on U.S. Provisional Application Ser. Nos. 60/276,923, 60/276,953, 60/276,954, and 60/276,955, all filed Mar. 20, 2001, the disclosures of which are incorporated herein by reference.

FIELD OF THE INVENTION

The present invention relates generally to communications systems and, more particularly, to an operational support system for integrating advanced telecommunication services with traditional telephony services.

BACKGROUND OF THE INVENTION

Telecommunications service providers continually increase the number of services and products they offer to customers. A recent trend, for example, is a desire to offer broadband, wireless, and Internet services. As competition increases, service providers must provide an increased level of support for these advanced data services while keeping costs down.

Conventional operational support systems typically rely on a single monolithic system to tie together multi-vendor hardware and software systems. As a result, no one system in the operational support system stands out as best of breed with respect to performance and flexibility. Moreover, as individual components are added to the single monolithic system, the resulting system becomes overly complex to develop, enhance, and maintain over the span of the product life cycle.

Accordingly, there is a need in the art for an operational support system that facilitates the integration of advanced data services and products with existing (or legacy) telephony systems.

SUMMARY OF THE INVENTION

Systems consistent with the principles of this invention address this and other needs by providing an operational support system that uniquely integrates traditional telephony systems with advanced data applications and services.

In an implementation consistent with the present invention, a communications system is provided. The communications system includes one or more telephony components, one or more data network components, a process management system, and a network interface. The data network components provide operations relating to data communications. The process management system manages the telephony components and the data network components. The network interface provides access to users to the telephony components, data network components, and process management system.

In another implementation consistent with the present invention, an operational support system includes a group of legacy telephony system components, a group of data network components, and a process manager. The process manager manages communications between the legacy telephony system components and the data network components.

In yet another implementation consistent with the present invention, a system includes a group of legacy telephony components, a first unit, a second unit, a third unit, a fourth unit, and a program management unit. The first unit provides a group of information services. The second unit provides customer service operations. The third unit provides VoIP related services. The fourth unit provides high performance backbone network services. The program management unit manages communications between the legacy telephony components, the first unit, the second unit, the third unit, and the fourth unit.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide an operational support system that uniquely integrates traditional telephony systems with advanced data systems and services, such as voice-over-Internet Protocol (VoIP) services, through the use of a process management system. The process management system supports modular enhancements to the operational support system. Implementations consistent with the present invention also provide the ability to access these traditional telephony systems and advanced data systems and services via a common network interface.

EXEMPLARY SYSTEM

Figure 1:
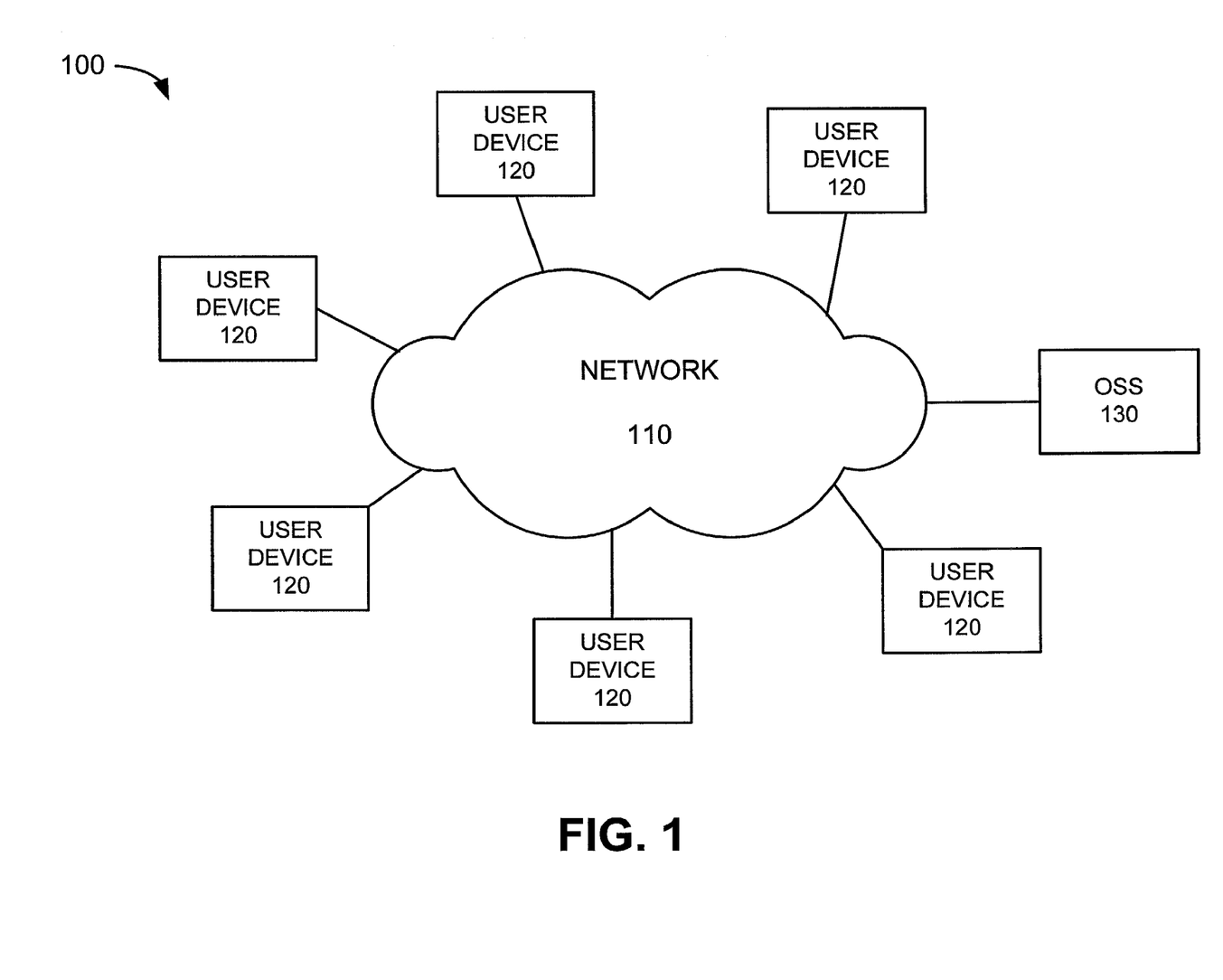
FIG. 1 illustrates an exemplary system in which systems and methods, consistent with the present invention, may be implemented.

FIG. 1 illustrates an exemplary system 100 in which systems and methods, consistent with the present invention, may be implemented. In FIG. 1, system 100 includes a network 110 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
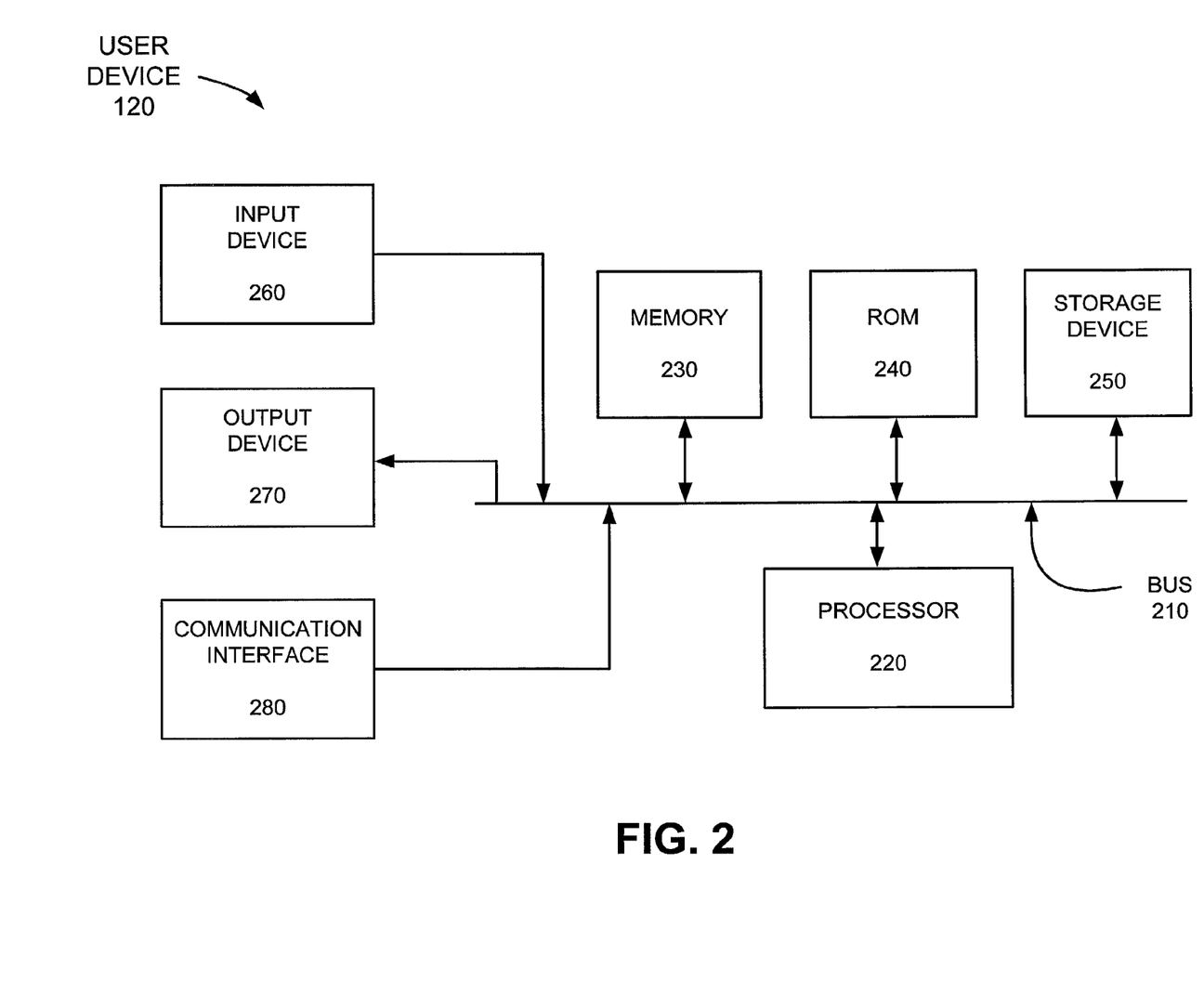
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. In one implementation consistent with the present invention, the processor 220 executes the instructions to cause a web browser to be displayed to an operator of the user device 120.

The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism or combination of mechanisms that permits an operator to input information to the user device 120, such as a keyboard, a mouse, a microphone, a pen, a biometric input device, such as voice recognition device, etc. The output device 270 may include any conventional mechanism or combination of mechanisms that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network.

Returning to FIG. 1, the OSS 130 provides the infrastructure for integrating data from traditional telephony services and applications with advanced data application platforms. Through OSS 130, customers, using, for example, user device 120, may manage, configure, and provision traditional telephony and advanced data services in real-time, obtain real-time billing information, and generate reports using a rules-centric middleware core. In one embodiment, a customer may perform these functions through a single point of entry using an Internet accessible web interface.

Figure 3:
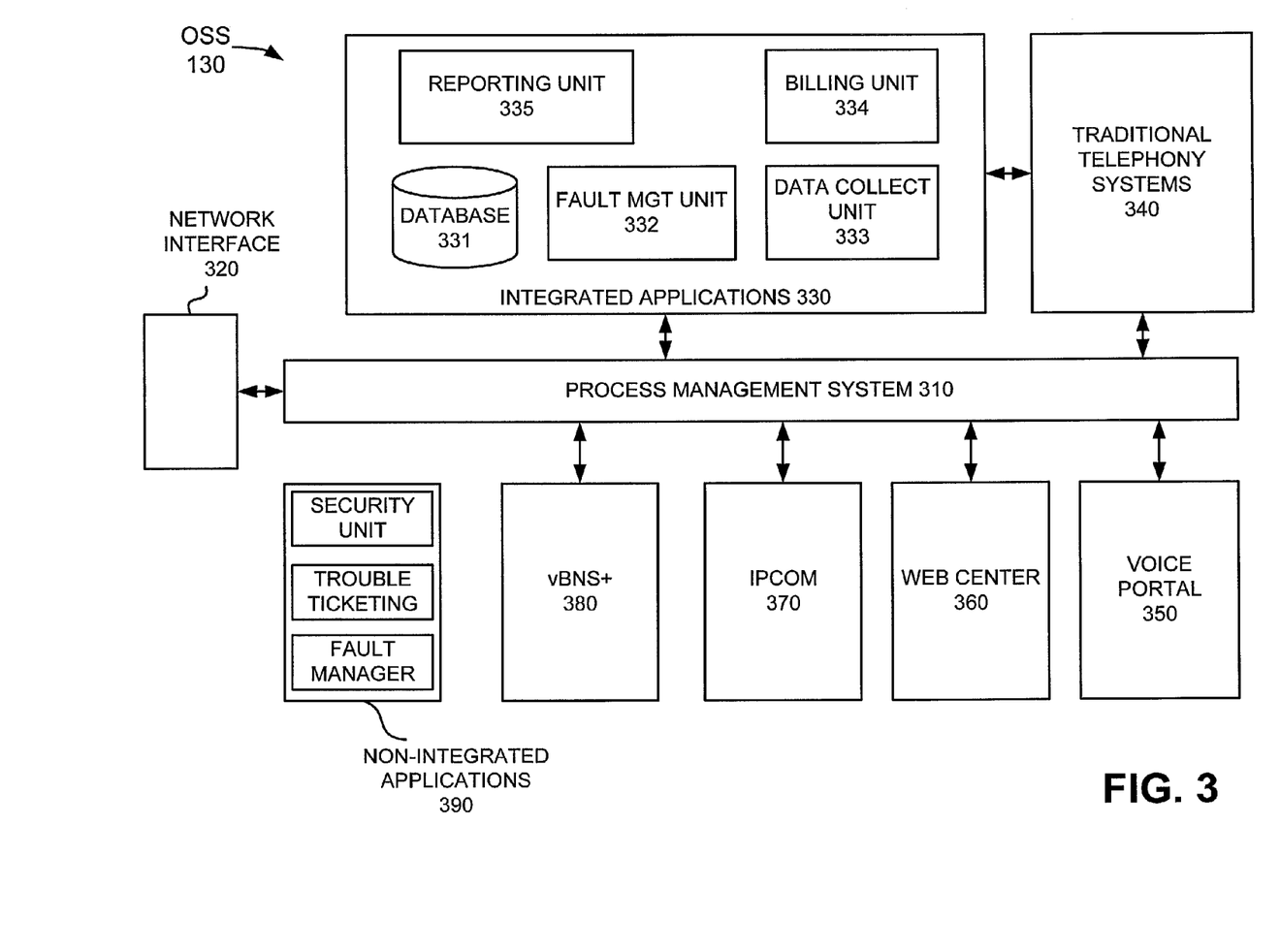
FIG. 3 illustrates an exemplary configuration of the operational support system of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an IPCOM unit 370, a very high performance backbone network service (vBNS+) unit 380, and a group of non-integrated applications 390. It will be appreciated that the OSS 130 may include other components (not shown) that aid in receiving, processing, and/or transmission of data.

The process management system 310 acts as the backbone to the OSS 130 by providing graphical process automation, data transformation, event management, and flexible connectors for interfacing with OSS components. In one implementation consistent with the present invention, the process management system 310 uses a Common Object Request Broker Architecture (CORBA) based publish-and-subscribe messaging middleware to integrate the different components of the OSS 130. Other techniques for integrating the different components of the OSS 130 may alternatively be used, such as eXtensible Markup Language (XML) or Enterprise JavaBeans (EJB). The process management system 310 may, for example, be implemented using Vitria Technology Inc.'s BusinessWare software system.

The network interface 320 provides a graphical user interface that allows users (e.g., customers, engineers, account teams, and the like) to access the components of the OSS 130. The network interface 320 may include commercial off the shelf (COTS) software or hardware packages, such as Siteminder® by Netegrity, Inc. and/or iPlanet™ by Sun Microsystems, Inc., custom software or hardware, or a combination of custom software/hardware and COTS software/hardware.

Via the network interface 320, customers may, for example, request that service be connected or disconnected, monitor or change network or user settings, obtain reports, and perform e-billing, account management, and trouble reporting and tracking functions in a real time manner. The network interface 320 may, for example, allow engineers to submit transactions to control and configure network elements and services in a real time manner. The network interface 320 may, for example, allow account teams to manage account creations and cancellations, generate subaccounts from master accounts, access current account data, and access historical account data. Additional information regarding the use of the network interface 320 to access components of the OSS 130 may be found in copending, commonly assigned, U.S. patent application Ser. No. 10/097,861, filed Mar. 15, 2002; U.S. patent application Ser. No. 10/097,870, filed Mar. 15, 2002; and U.S. patent application Ser. No. 10/097,865, filed Mar. 15, 2002, the disclosures of which are incorporated by reference herein.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130. Once authenticated, users may access those components of the OSS 130 to which they have been provided authorization. Additional information regarding this single sign-on technique can be found in copending, commonly assigned, U.S. patent application Ser. No. 10/097,935, filed Mar. 15, 2002, the entire contents of which are expressly incorporated by reference herein.

The integrated applications 330 may include, for example, a database 331, a fault management unit 332, a data collection unit 333, a billing unit 334, and a reporting unit 335. The database 331 may include one or more separate databases for storing data. In one implementation, the database 331 includes a data warehouse, an operational data store, and a lightweight directory access protocol (LDAP) directory server. The data warehouse acts as a repository for service order, account, usage, and performance data. In one implementation, the data warehouse may be implemented as a relational database management system (RDBMS) based system.

The operational data store temporarily stores data that is used in the course of fulfilling, for example, account creation, service order management, and network provisioning operations. The operational data store also stores authentication and authorization data. This data defines user's roles and privileges. Like the data warehouse, the operational data store may be a RDBMS based system.

The LDAP directory server stores similar information to that described above with respect to the operational data store, however, the LDAP directory server stores entries in a hierarchical, tree-like structure. As a result, the LDAP directory server provides a quick response to high volume lookup and/or search operations. Additional information regarding LDAP can be found in W. Yeong et al., "Lightweight Directory Access Protocol," RFC 1777, March 1995, the contents of which are incorporated by reference herein.

The fault management unit 332 monitors and manages the overall operation of the OSS 130. The fault management unit 332 receives information from every device, computer and application in the OSS 130 via the process management system 310 and, in situations where a fault has been detected, may transmit trouble tickets identifying the fault to the appropriate system administrator. In one implementation, the fault management unit 332 may be implemented using PATROL Infrastructure Management software from BMC Software, Inc.

The data collection unit 333 collects customer usage and performance data for the devices supported by the OSS 130, transforms the data, if necessary, and passes the data on to the appropriate device, such as the billing unit 334, the database 331, etc. In one implementation, the data collection unit 333 utilizes a hierarchical architecture, having a centralized manager that defines and manages collection and data transformation schemas. Individual, lower level gatherers interface with source targets. In one implementation, the data collection unit 333 may be implemented using the XACCT Interface Server (XIS) from XACCT Technologies.

The billing unit 334 receives customer usage and performance data from the data collection unit 333 and generates bills in a well-known manner based thereon. The billing unit 334 may be configured with a variety of rating rules and plans and may provide mechanisms to manage and create rating plans, as well as mechanisms for building revenue reports and generating billing reports. The rating rules may be customized based on a particular customer's requirements or generalized. The rating rules may include traditional telephony styled rating rules that include time-of-day, day-of-week, distance-based, flat rate, non-recurring, and recurring on a definably regular basis, such as weekly, bi-weekly, monthly, etc., ratings. In an exemplary implementation of the present invention, the billing unit 334 may also provide bonus points, airline miles, and other incentive items as part of the rules-based rating and billing service.

Billing unit 334 may provide revenue and billing reports to authorized parties. Billing unit 334 may allow customers to access previous invoices and view current charges not yet billed. In an exemplary implementation consistent with the present invention, billing unit 334 may transfer rated events and summary records into other billing and revenue systems. For example, billing unit 334 may receive and transfer billing information or event information to a legacy billing system (i.e., an existing billing system) that generates the actual bill. In alternative implementations, billing unit 334 may provide hard copy bills and/or provide electronic bills to a customer. In this implementation, billing unit 334 may be configured to perform electronic payment handling.

As customer orders and accounts are created or modified through normal business functions, the OSS 130 keeps the billing unit 334 up to date in a real-time manner via the process management system 310. Authorized parties may also extract real-time data from the billing unit 334. In one implementation, the billing unit 334 may be implemented using Infranet® software from Portal Software, Inc.

The reporting unit 335 may interact with various components of the OSS 130, such as the database 331 and billing unit 334, to provide users (i.e., customers, engineers, and accountants) with the ability to obtain reports based on real-time data. The reports may include, for example, billing reports, reports regarding the usage and/or performance of the network, etc. In one implementation, the reporting unit 335 may be implemented using Actuate software from Progress Software Corporation.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant, a paging device, and the like) and may also track a subscriber's access to the services for billing purposes.

The web center 360 acts as a virtual call center by queuing, routing, and distributing communications from any first location to an appropriate agent at any second location. The web center 360 allows agents to handle multiple mediums (e.g., inbound telephone calls, faxes, e-mails, voicemail, VoIP transactions, etc.) via a single browser-based interface. In one implementation, the web center 360 may be implemented using CallCenter@anywhere from Telephony@Work Inc.

The IPCOM unit 370 may include one or more devices that provide VoIP services to subscribers. The subscribers may make and receive calls via an IP communications network using, for example, session initiation protocol (SIP) telephones. The IPCOM unit 370 may support the following exemplary services: follow me, call blocking, call forwarding, voice mail, conference calling, single line extension, call screening, quality of service, class of service, dial-plan restrictions, dynamic registration, secondary directory number, and call transfer. As described above, customers may set or change attributes associated with these features via the network interface 320.

The vBNS+ unit 380 provides the IP infrastructure for the IP communications network. The vBNS+ unit 380 may include a group of routers that route packets in the network. The non-integrated applications 390 may include, for example, a security unit, a trouble ticketing unit, and a fault manager. The security unit may include one or more firewalls for securing the network interface 320, telephone equipment (e.g., PBX, switch, and redirect server), and network operations. The trouble ticketing unit manages the issuance and resolution of trouble tickets. The fault manager monitors the hardware components of the OSS 130.

Figure 4:
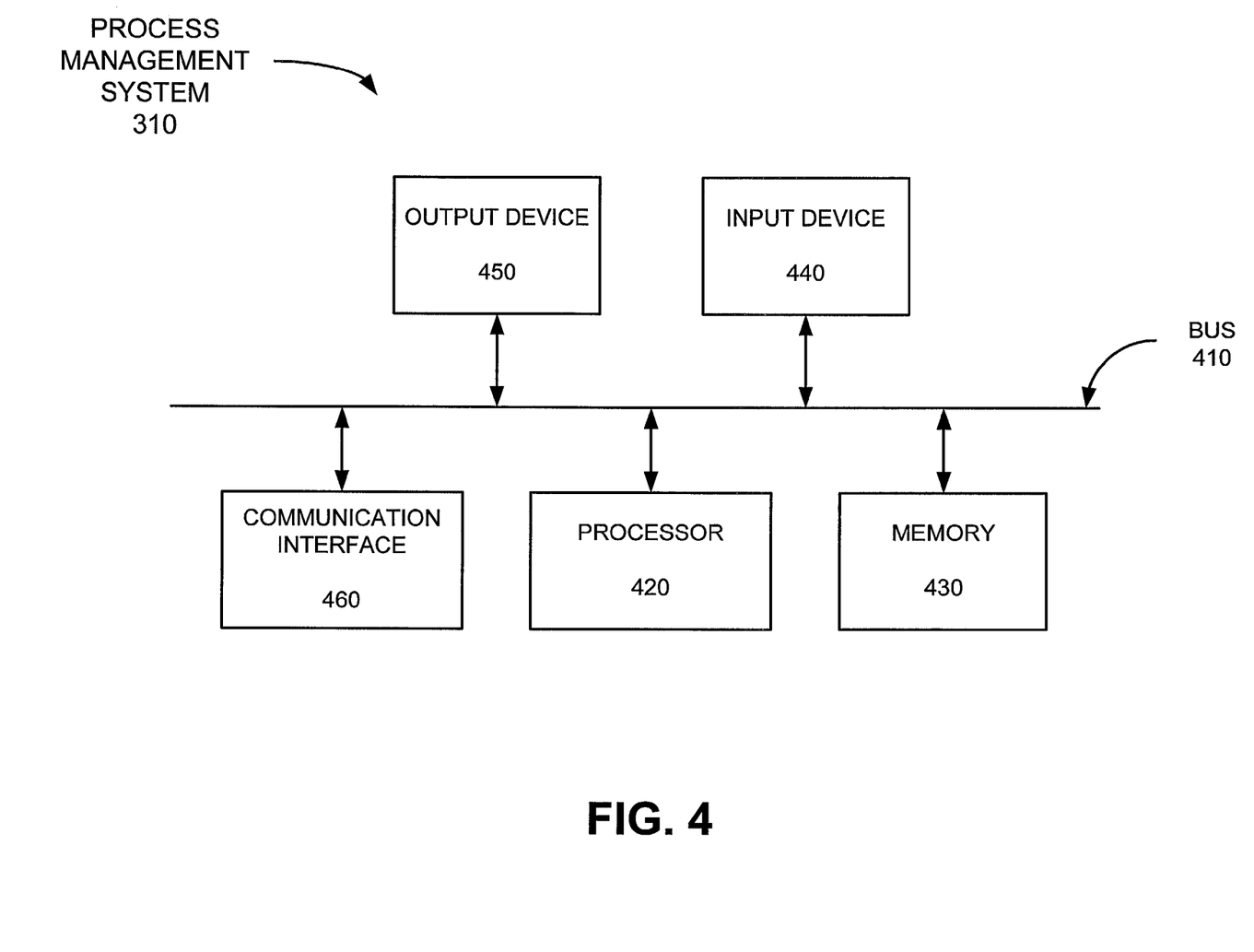
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism or combination of mechanisms that permits an operator to input information to the process management system 310, such as a keyboard, a mouse, a pen, a biometric mechanism, and the like. The output device 450 may include any conventional mechanism or combination of mechanisms that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

Execution of the sequences of instructions contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
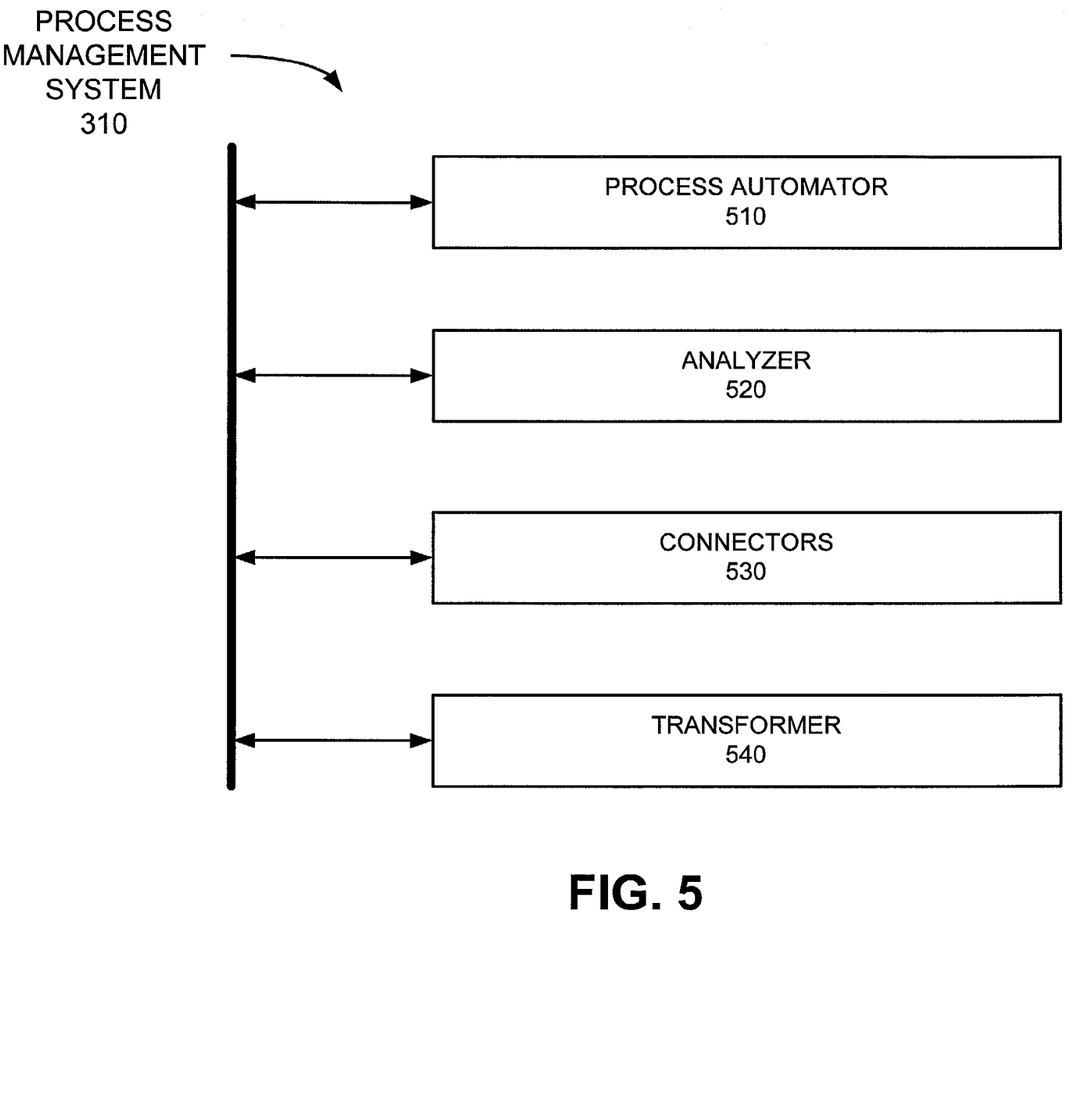
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, and a transformer 540. It will be appreciated that the process management system 310 may include additional functional elements (not shown) that aid in the reception, processing, and/or transmission of data.

The processor automator 510 includes a modeling tool that allows event processing to be visually modeled by engineers and product development analysts. The process automator 510 can then execute these models to create an automated business process. The analyzer 520 provides on-going and real time monitoring of the components of the OSS 130. The analyzer 520 delivers reports, history, and trending on events processed through the process management system 310.

The connectors 530 include a group of customized rules that allows the components of the OSS 130 to interact and communicate with the process management system 310. A unique connector 530 may be established for each component in the OSS 130. As new components are added to the OSS 130, new connectors 530 are established to allow the new components to communicate with the existing components of the OSS 130. Once the connectors 530 have been established, the OSS components may communicate with the process management system 310 via standard messaging or through full publish/subscribe processing. Additional details regarding this communication process can be found in copending, commonly assigned, U.S. patent application Ser. No. 10/097,863, filed Mar. 15, 2002; U.S. patent application Ser. No. 10/097,862, filed Mar. 15, 2002; U.S. Patent Application Ser. No. 10/097,866, filed Mar. 15, 2002; and U.S. patent application Ser. No. 10/097,934, filed Mar. 15, 2002, the disclosures of which are incorporated by reference herein.

The transformer 540 inspects data received by the connectors 530. The transformer 540 may also transform the data received by the connectors 530, if necessary, prior to the data being transferred on to its destination.

Figure 6:
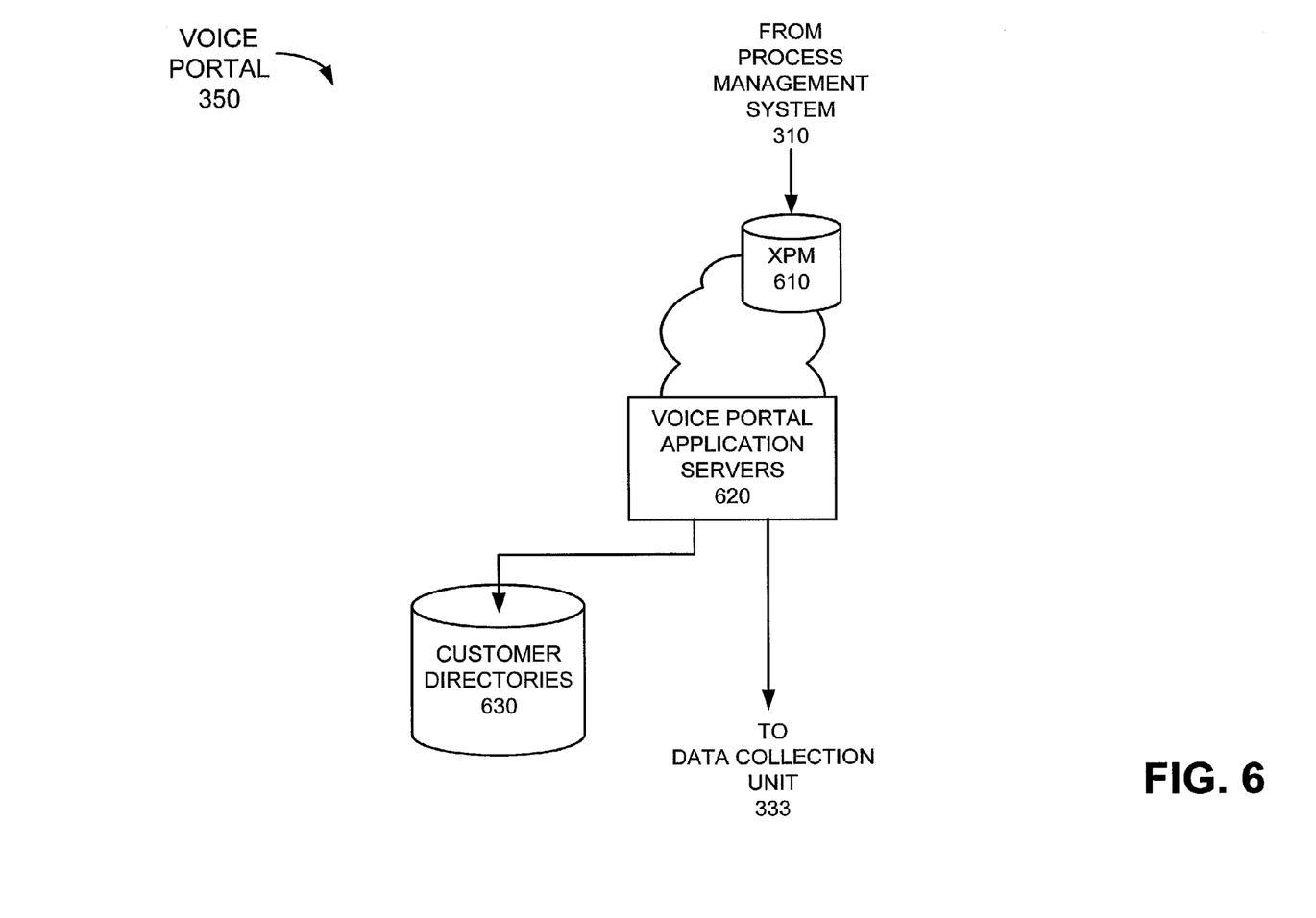
FIG. 6 illustrates an exemplary configuration of the voice portal unit of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an eXtensible Program Management (XPM) unit 610, one or more voice portal application servers 620, and a customer directory database 630. The XPM unit 610 receives user profile information from the network interface 320 via the process management system 310 and stores this information for use by the voice portal application servers 620. The XPM unit 610 may also receive other information, such as information identifying the device(s) (e.g., personal digital assistant, cellular telephone, pager, etc.) by which the customer wishes to receive the service(s) provided.

The voice portal application servers 620 may include one or more servers that interact with the XPM unit 610 to provide, for example, banking, brokerage, and financial services, travel and entertainment services, distribution and shipping services, insurance services, health and pharmaceutical services, manufacturing services, and the like. Voice portal application servers 620 may also provide data collection unit 333 with information regarding what services are accessed and by whom. The data collection unit 333 may then pass this information on to the billing unit 334 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real-time sports scores, etc.

Figure 7:
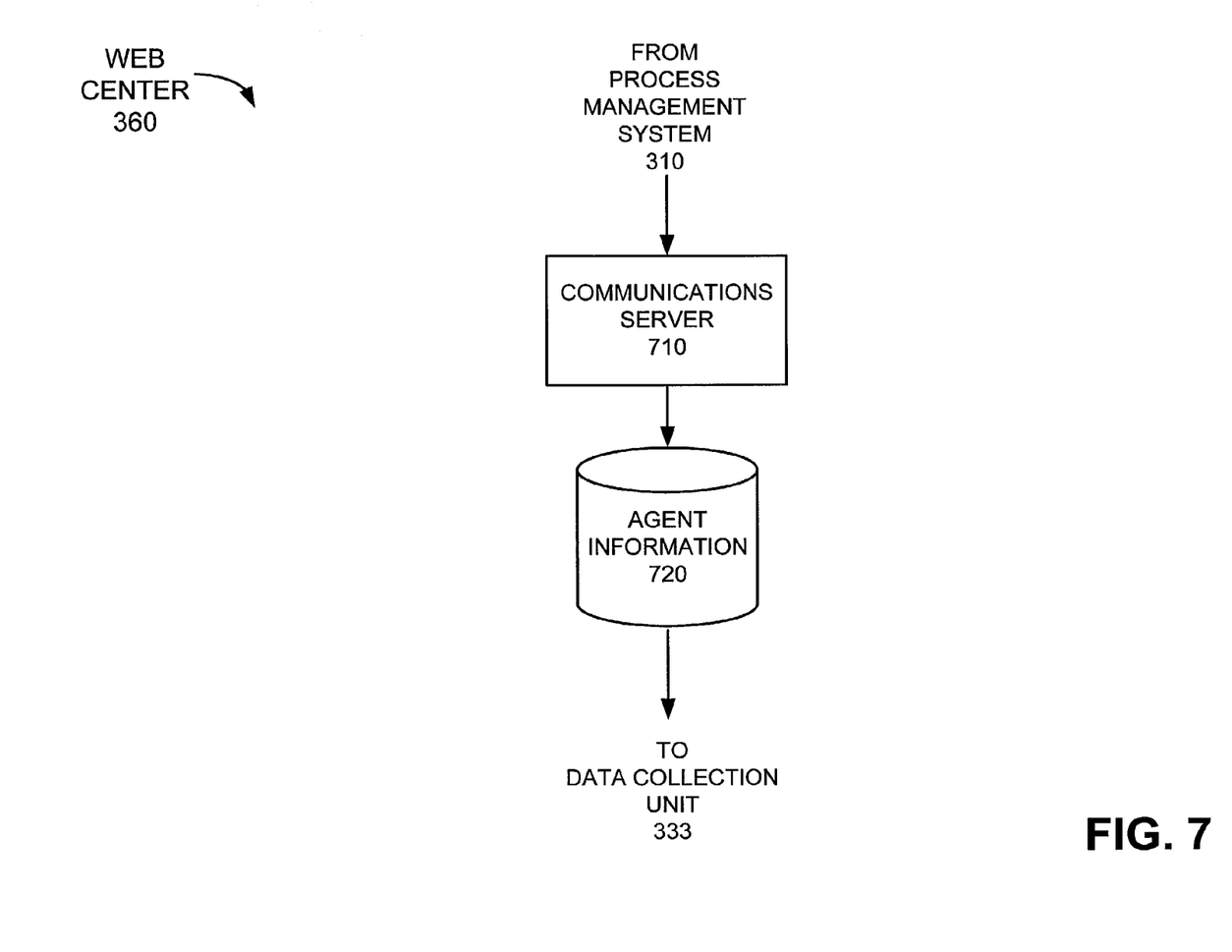
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communications server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 333 and then to the billing unit 334 for billing. Users may, via the network interface 320, provision new services, such as order a toll free number, and/or create new accounts at the web center 360.

Figure 8:
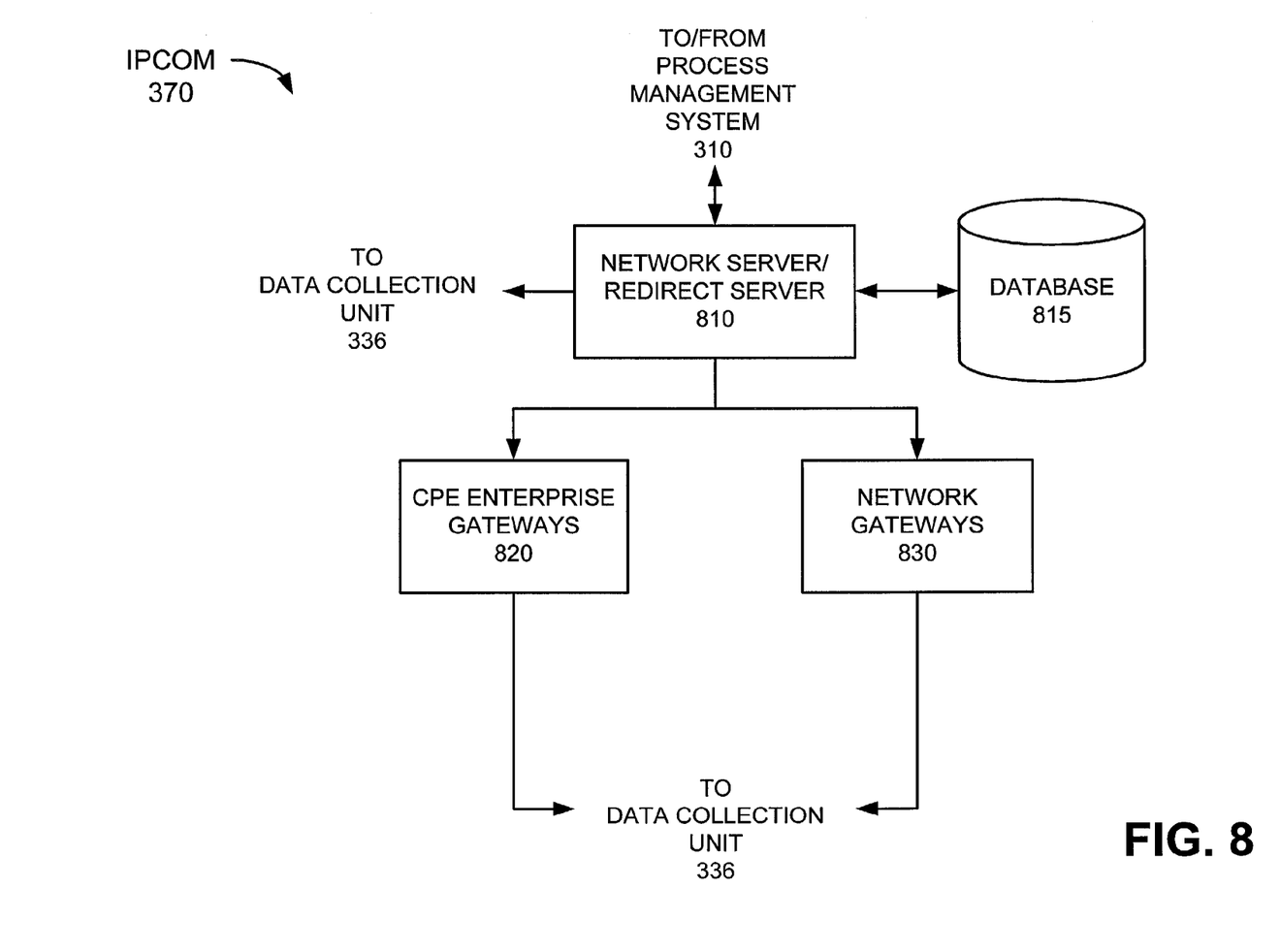
FIG. 8 illustrates an exemplary configuration of the Internet Protocol Communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a network server/redirect server 810, CPE enterprise gateways 820, and network gateways 830. The network server/redirect server 810 processes calls made over the IP communications network based on data stored in an associated database 815. The database 815 may store data (or records) relating to call processing (e.g., information identifying the device by which the subscriber wishes to receive the call, network configuration information, etc.), subscriber profiles (e.g., subscriber identifiers), and network-supported features. The network server/redirect server 810 may direct calls to the appropriate gateway 820 or 830 based on this data. The network-supported features may include, for example, follow me, call blocking, call forwarding, voice mail, conference calling, single line extension, call screening, quality of service, class of service, dial-plan restrictions, dynamic registration, secondary directory number, and call transfer. As described above, a user may change the attributes associated with these features via the network interface 320.

The CPE enterprise gateways 820 may include one or more gateways for linking customer systems to the IP communications network. The CPE enterprise gateways 820 may, for example, connect to a customer's PBX and convert time division multiplexed (TDM) voice data into VoIP packets and voice signaling into SIP messages. The network gateways 830 include one or more gateways for linking the IP communications network to the PSTN in a well-known manner. The redirect server 810, CPE enterprise gateways 820, and network gateways 830 track customer access and transmit this customer access data to the data collection unit 336 for billing purposes.

Figure 9:
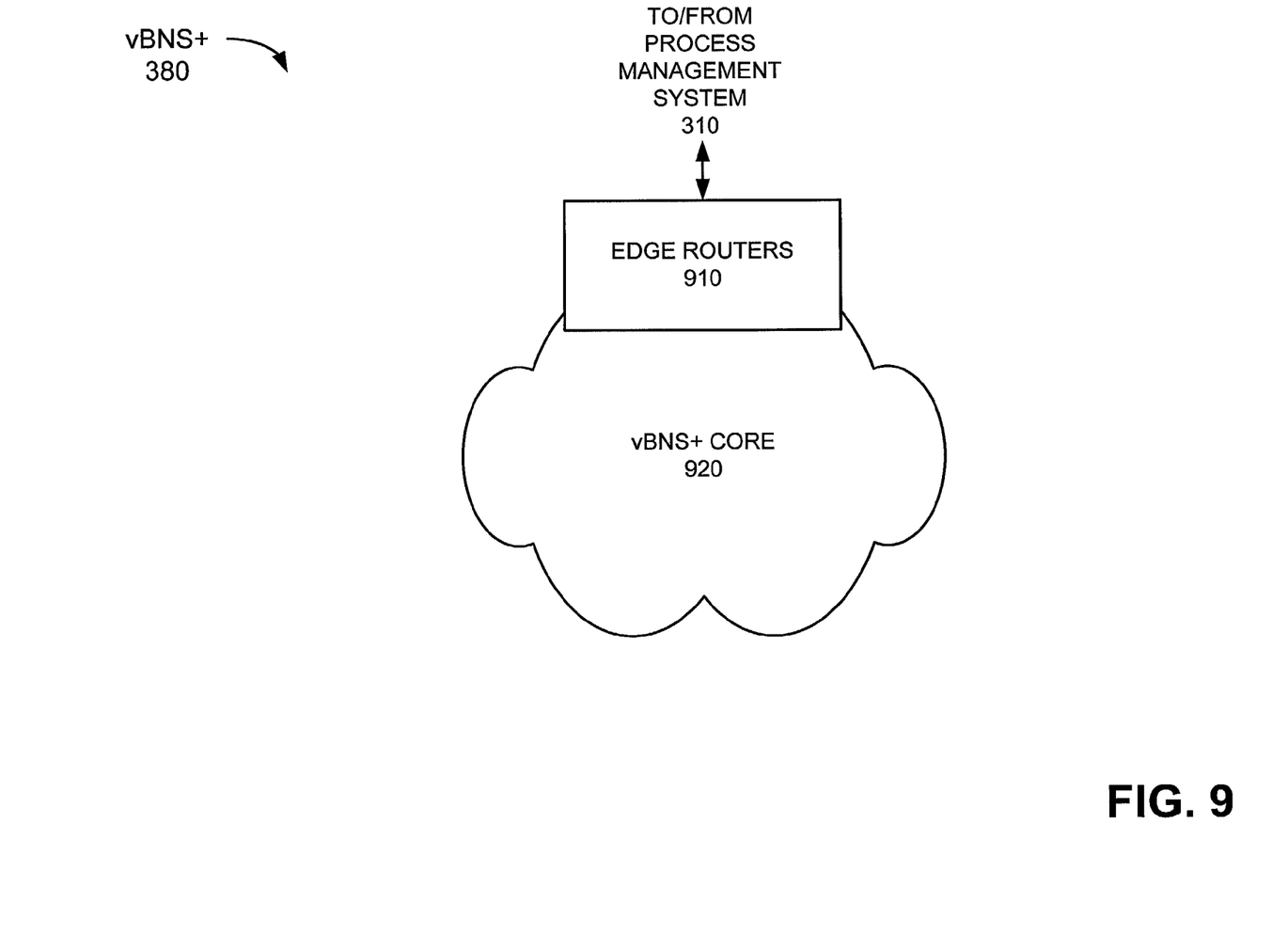
FIG. 9 illustrates an exemplary configuration of the very high performance backbone network service unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server/redirect server 810, network gateways 830, customer's CPE equipment, other routers in the IPCom network, directly to SIP telephones, etc. The edge routers 910 may be configured or updated via the network interface 320. The vBNS+ core 920 may include one or more core routers for routing packets between edge routers 910.

CONCLUSION

Implementations consistent with the present invention provide an operational support system that uniquely integrates traditional telephony systems with advanced data systems and services, such as VoIP services, through the use of a process management system. The process management system supports modular enhancements to the operational support system using, for example, custom Java code, C++, JSP, XML, HTML, in an object oriented manner. As a result, deployment costs and time to market timelines for products/services may be greatly reduced. Moreover, this unique bundling of components supports best of breed functionality.

The operational support system's network interface provides users with access to the components of the operational support system via a single sign-in operation. Via this interface, customers may, for example, request that service be connected or disconnected, monitor or change network or user settings, obtain reports, and perform e-billing, account management, and trouble reporting and tracking functions in a real-time manner. Network engineers may use the network interface to submit transactions to control and configure network elements and services in a real-time manner. Account teams may use the network interface to manage account creations and cancellations, generate sub-accounts from master accounts, access current account data, and access historical account data.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, it will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A communications system comprising:
one or more telephony components;
one or more data network components configured to provide operations relating to data communications;
a process management system configured to manage the telephony components and the data network components; and
a network interface configured to provide access to users to the telephony components, data network components, and process management system wherein the process management system includes:
a process automator configured to generate an automated business process for the one or more telephony components, the one or more data network components, and the network interface,
an analyzer configured to provide real-time monitoring of the one or more telephony components and the one or more data network components, and
a plurality of connectors configured to provide connections between the process management system and the one or more telephony components, the one or more data network components, and the network interface.

2. The communications system of claim 1 wherein the one or more telephony components includes at least one of a legacy billing unit, a legacy service provisioning unit, and a legacy order entry unit.

3. The communications system of claim 1 wherein the one or more data network components includes an Internet Communications (IPCom) unit configured to provide Voice over Internet Protocol (VoIP) services.

4. The communications system of claim 3 wherein the IPCom unit includes a redirect server, a plurality of enterprise gateways, and a plurality of network gateways.

5. The communications system of claim 1 wherein the one or more data network components includes a voice portal unit configured to provide information services to subscribers.

6. The communications system of claim 5 wherein the voice portal unit includes:
a plurality of voice portal application servers configured to provide different information services, and
an extensible program management unit configured to manage customer profile information.

7. The communications system of claim 6 wherein the information services include at least one of banking, brokerage, and financial services, travel and entertainment services, distribution and shipping services, insurance services, health and pharmaceutical services, and manufacturing services.

8. The communications system of claim 1 wherein the one or more data network components includes a web center unit configured to route incoming communications to an agent.

9. The communications system of claim 8 wherein the web center unit includes:
an agent database configured to store agent information, and
a communications server configured to route incoming communications based on the stored agent information.

10. The communications system of claim 9 wherein the agent information includes at least one of agent availability information and agent skill information.

11. The communications system of claim 1 wherein the one or more data network components includes a very high performance backbone network service (vBNS) unit configured to route data communications.

12. The communications system of claim 1 wherein the one or more data network components includes a database configured to store network data.

13. The communications system of claim 12 wherein the database includes:
a data warehouse configured to store service order, account, usage, and performance data,
an operational data store configured to temporarily store data used in one or more of account creation, service order management, and network provisioning operations, and
a lightweight directory access protocol (LDAP) directory server configured to store data similar to the operational data store in a hierarchical format.

14. The communications system of claim 12 wherein the one or more data network components further includes a fault management unit configured to monitor and manage operations of the communications system.

15. The communications system of claim 14 wherein the one or more data network components further includes a data collection unit configured to collect customer usage and performance data for the one or more telephony components and the one or more data network components.

16. The communications system of claim 15 wherein the one or more data network components further includes a billing unit configured to generate bills based on the collected customer usage and performance data.

17. The communications system of claim 16 wherein the one or more data network components further includes a reporting unit configured to generate reports based on real-time network data.

18. The communications system of claim 1 wherein the users include at least one of customers, engineers, and accounting personnel.

19. The communications system of claim 1 wherein the network interface is further configured to authenticate the users prior to providing the access.

20. An operational support system comprising:
a plurality of telephony system components;
a plurality of data network components; and
a process manager configured to manage communications between the plurality of telephony system components and the plurality of data network components
a process automator configured to generate an automated business process for the plurality of telephony system components and the plurality of data network components wherein the process manager includes:
an analyzer configured to provide real-time monitoring of the plurality of telephony system components and the plurality of data network components, and
a plurality of connectors configured to integrate the plurality of telephony system components and the plurality of data network components with the process manager.

21. The operational support system of claim 20 wherein the plurality of telephony system components includes one or more of a legacy billing unit, a legacy service provisioning unit, and a legacy order entry unit.

22. The operational support system of claim 21 wherein the plurality of data network components includes components that provide at least one of Voice over Internet Protocol (VoIP) services, voice portal application services, customer service, and very high performance backbone network services.

23. The operational support system of claim 22 wherein the plurality of data network components further includes:
a database,
a data collection unit configured to collect customer usage and performance data for the plurality of telephony system components and the plurality of data network components,
a billing unit configured to generate bills based on the collected customer usage and performance data,
a fault management unit configured to monitor and manage operations of the operational support system, and
a reporting unit configured to generate reports based on real-time network data.

24. The operational support system of claim 20 further comprising:
a network interface configured to provide access to remote users to the plurality of telephony system components, the plurality of data network components, and the process manager.

25. A system comprising:
a group of legacy telephony components;
a first unit configured to provide a plurality of information services;
a second unit configured to provide customer service operations;

a third unit configured to provide Voice over Internet Protocol (VoIP) related services;

a fourth unit configured to provide high speed backbone network services; and a program management unit configured to manage communications between the group of legacy telephony components, the first unit, the second unit, the third unit, and the fourth unit.

26. The system of claim 25 further comprising:

a fifth unit configured to provide database services;

a sixth unit configured to collect customer usage and performance data for the group of legacy telephony system components, the first unit, the second unit, the third unit, and the fourth unit;

a seventh unit configured to generate bills based on the collected customer usage and performance data;

an eighth unit configured to monitor and manage operations of the system; and a ninth unit configured to generate reports based on real-time network data.

27. The system of claim 25 further comprising:

a network interface configured to provide access to the plurality of legacy telephony system components, the first unit, the second unit, the third unit, and the fourth unit.

* * * * *